(12) United States Patent
Chung et al.

(10) Patent No.: US 10,656,310 B2
(45) Date of Patent: May 19, 2020

(54) OPTICAL FILM AND A LIQUID CRYSTAL DISPLAY INCLUDING THE SAME

(71) Applicant: SAMSUNG DISPLAY CO., LTD., Yongin-si, Gyeonggi-Do (KR)

(72) Inventors: Seung Hwan Chung, Asan-si (KR); Ju Youn Son, Hwaseong-si (KR); Joong Hyun Kim, Asan-si (KR); Chan Jae Park, Osan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/406,792

(22) Filed: May 8, 2019

(65) Prior Publication Data

US 2019/0265392 A1    Aug. 29, 2019

Related U.S. Application Data

(62) Division of application No. 14/699,579, filed on Apr. 29, 2015.

(30) Foreign Application Priority Data

Dec. 18, 2014    (KR) .................. 10-2014-0182934

(51) Int. Cl.
*G02F 1/1335*    (2006.01)
*G02B 3/00*    (2006.01)

(52) U.S. Cl.
CPC ........ *G02B 3/005* (2013.01); *G02F 1/133526* (2013.01); *G02F 2001/133562* (2013.01); *G02F 2202/28* (2013.01)

(58) Field of Classification Search
CPC .................. G02F 1/133526; G02F 2202/28; G02B 3/005
See application file for complete search history.

(56) References Cited

U.S. PATENT DOCUMENTS

| | | | |
|---|---|---|---|
| 5,555,476 A | 9/1996 | Suzuki et al. | |
| 8,451,403 B2 * | 5/2013 | Tsai .................. | G02F 1/133526 345/88 |
| 8,970,811 B2 | 3/2015 | Park et al. | |
| 9,348,066 B2 | 5/2016 | Oh et al. | |

(Continued)

FOREIGN PATENT DOCUMENTS

| JP | 2008-233824 | 10/2008 |
|---|---|---|
| KR | 1999-0065493 | 8/1999 |

(Continued)

OTHER PUBLICATIONS

Korean Office Action dated Dec. 18, 2014.

*Primary Examiner* — Paisley L Wilson
(74) *Attorney, Agent, or Firm* — F. Chau & Associates, LLC

(57) ABSTRACT

An optical film is provided. The optical film includes a base film and a cover film. The base film includes a base member and a plurality of lens patterns disposed on the base member. The plurality of lens patterns protrudes from the base member and extends in a first direction. The cover film is disposed on the base film to cover the base member and the plurality of lens patterns. A refractive index of at least one of the lens patterns is smaller than a refractive index of the cover film. An aspect ratio of the at least one of the lens patterns ranges from 0.8 to 1.6.

4 Claims, 15 Drawing Sheets

(56) References Cited

U.S. PATENT DOCUMENTS

| | | | |
|---|---|---|---|
| 9,349,993 B2 | 5/2016 | Oh et al. | |
| 2012/0176572 A1* | 7/2012 | Park | G02B 3/005 349/112 |
| 2014/0353645 A1* | 12/2014 | Jeong | H01L 51/5275 257/40 |
| 2016/0178610 A1 | 6/2016 | Chung et al. | |

FOREIGN PATENT DOCUMENTS

| | | |
|---|---|---|
| KR | 20100033663 | 3/2010 |
| KR | 1020100079723 | 7/2010 |
| KR | 20120081362 | 7/2012 |
| KR | 20120127897 | 11/2012 |
| KR | 1020130078018 | 7/2013 |
| KR | 20140110677 | 9/2014 |
| KR | 20140110678 | 9/2014 |

* cited by examiner

OPTICAL FILM AND A LIQUID CRYSTAL DISPLAY INCLUDING THE SAME

CROSS-REFERENCE TO RELATED APPLICATION

This application is a Division of co-pending U.S. patent application Ser. No. 14/699,579, filed on Apr. 29, 2015, which claims priority under 35 U.S.C. § 119 to Korean Patent Application No. 10-2014-0182934, filed on Dec. 18, 2014, in the Korean Intellectual Property Office, the disclosure of which is incorporated by reference herein in its entirety.

TECHNICAL FIELD

The present invention relates to an optical film and a liquid crystal display including the same.

DISCUSSION OF THE RELATED ART

A liquid crystal display may include a thin film transistor, a pixel electrode, a common electrode, and liquid crystal interposed between two substrates facing each other.

A viewing angle of a liquid crystal display may refer to a maximum angle at which the display can be viewed with acceptable visual performance.

SUMMARY

According to an exemplary embodiment of the present invention, an optical film is provided. The optical film includes a base film and a cover film. The base film includes a base member and a plurality of lens patterns disposed on the base member. The plurality of lens patterns protrudes from the base member and extends in a first direction. The cover film is disposed on the base film to cover the base member and the plurality of lens patterns. A refractive index of at least one of the lens patterns is smaller than a refractive index of the cover film. An aspect ratio of the at least one of the lens patterns ranges from 0.8 to 1.6.

In an exemplary embodiment of the present invention, the refractive index of the cover film may be larger than the refractive index of the at least one of the lens patterns by 0.1 to 0.65.

In an exemplary embodiment of the present invention, at least one of the lens patterns may have a shape of a lenticular lens or an elliptical lens.

In an exemplary embodiment of the present invention, the refractive index of the at least one of the lens patterns may range from 1.0 to 1.49.

In an exemplary embodiment of the present invention, the refractive index of the at least one of the lens patterns may range from 1.42 to 1.49.

In an exemplary embodiment of the present invention, the refractive index of the cover film may range from 1.5 to 1.65.

In an exemplary embodiment of the present invention, the refractive index of the cover film may range from 1.57 to 1.65.

In an exemplary embodiment of the present invention, the optical film may further include an adhesive layer formed on the base member and formed on a surface opposite to a surface on which the cover film is formed.

According to an exemplary embodiment of the present invention, an optical film is provided. The optical film includes a cover film. The cover film includes intaglios of a plurality of lens patterns extending in a first direction. An aspect ratio of at least one of the intaglios of the lens patterns ranges from 0.8 to 1.6. A refractive index of the cover film ranges from 1.5 to 1.65.

In an exemplary embodiment of the present invention, the optical film may further include a base film. The base film may be attached to a surface of the cover film on which each of the intaglios of the lens patterns is formed.

In an exemplary embodiment of the present invention, the optical film may further include an air layer in the intaglios of the lens patterns disposed between the cover film and the base film.

In an exemplary embodiment of the present invention, the optical film may further include an adhesive formed on a first portion of a surface between the cover film and the base film. The intaglios of the lens patterns may not be formed on the first portion of the surface.

In an exemplary embodiment of the present invention, the optical film may further include a filling layer disposed in the intaglios of the lens patterns of the cover film. A refractive index of the filling layer may range from 1.0 to 1.49.

In an exemplary embodiment of the present invention, at least one of the lens patterns may have a shape of a lenticular lens or an elliptical lens.

According to an exemplary embodiment of the present invention, a liquid crystal display is provided. The liquid crystal display includes a backlight unit, a liquid crystal panel, and an optical film. The liquid crystal panel receives light from the backlight unit to display an image. The optical film is disposed on an upper side of the liquid crystal panel. The optical film includes a plurality of lens patterns extending in a first direction, and an aspect ratio of at least one of the lens patterns ranges from 0.8 to 1.6.

In an exemplary embodiment of the present invention, the optical film may include a base film and a cover film. The base film may include a base member and the plurality of lens patterns. The cover film may be formed on the base film to cover the base member and the plurality of lens patterns. The refractive index of the at least one of the lens patterns may be smaller than a refractive index of the cover film.

In an exemplary embodiment of the present invention, the refractive index of the at least one of the lens patterns may range from 1.0 to 1.49, and the refractive index of the cover film may range from 1.5 to 1.65.

In an exemplary embodiment of the present invention, the optical film may include a cover film which is attached to an upper side of the liquid crystal panel, and the plurality of lens patterns may be formed as intaglios in the cover film.

In an exemplary embodiment of the present invention, the liquid crystal display may further include an adhesive formed on a first portion of a surface between the cover film and the liquid crystal panel. The intaglios of the lens patterns may not be formed on the first portion of the surface.

In an exemplary embodiment of the present invention, the liquid crystal display may further include an air layer or a filling layer. The air layer may be disposed in each of the intaglios of the lens patterns. The filling layer may be disposed in each of the intaglios of the lens patterns. A refractive index of the filling layer may range from 1.0 to 1.49, and a refractive index of the cover film may range from 1.5 to 1.65.

According to an exemplary embodiment of the present invention, a liquid crystal display is provided. The liquid crystal display includes a liquid crystal panel and an optical film. The liquid crystal panel displays an image. The optical film is disposed on an upper side of the liquid crystal panel.

The optical film includes a plurality of lens patterns extending in a first direction. A refractive index of at least one of the lens patterns ranges from 1.0 to 1.49. An aspect ratio of the at least one of the lens patterns ranges from 0.8 to 1.6.

BRIEF DESCRIPTION OF THE DRAWINGS

The above and other features of the present invention will become more apparent by describing in detail exemplary embodiments thereof with reference to the attached drawings, in which.

DETAILED DESCRIPTION OF THE EMBODIMENTS

Figure 1:
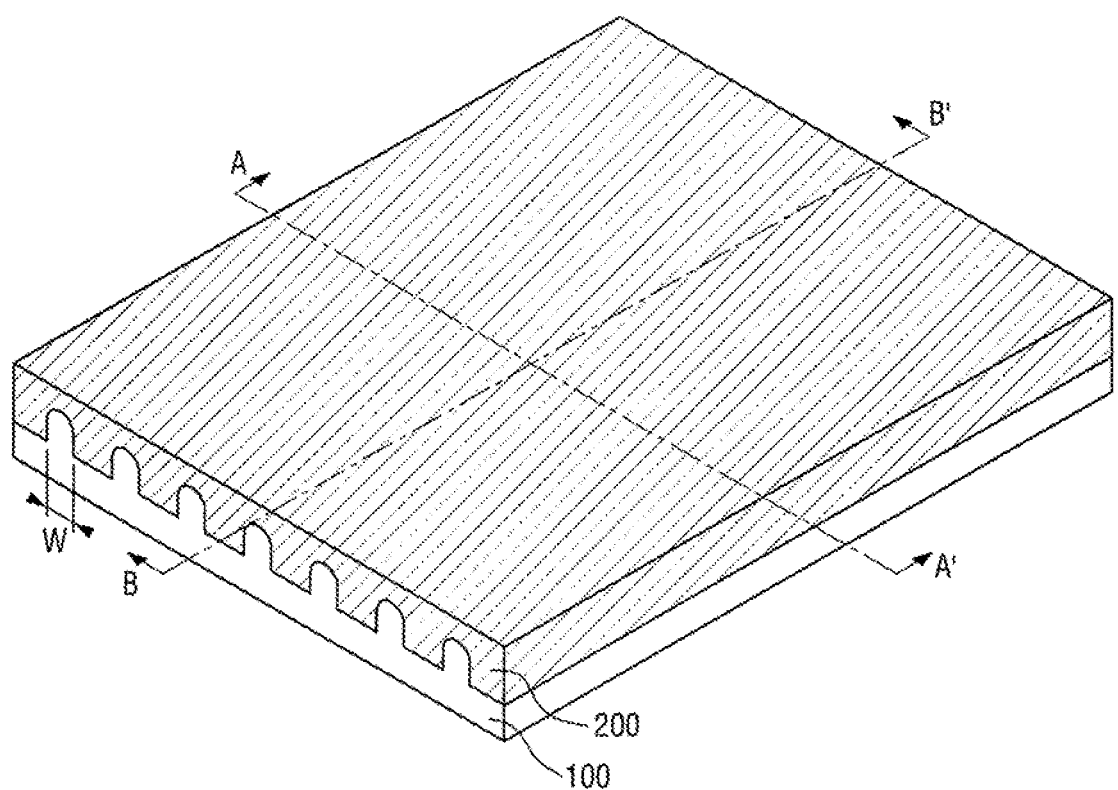
FIG. 1 is a perspective view of an optical film according to an exemplary embodiment of the present invention.

Exemplary embodiments of the present invention will hereinafter be described with reference to the accompanying drawings. However, the present invention may be embodied in different forms and should not be construed as limited to the exemplary embodiments disclosed herein. The same reference numerals may refer to the same elements throughout the specification and drawings. In the drawings, sizes and relative sizes of layers and areas may be exaggerated for clarity.

Hereinafter, exemplary embodiments of the present invention will be described with reference to the accompanying drawings.

Figure 2:
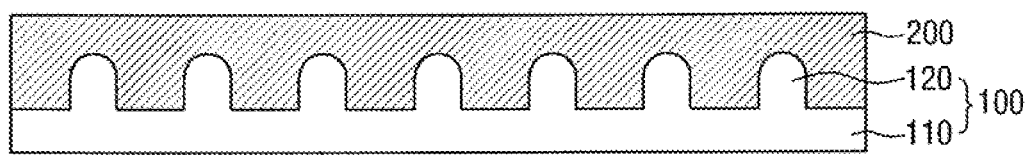
FIG. 2 is a cross-sectional view of the optical film taken along line A-A' of FIG. 1.
Figure 3:
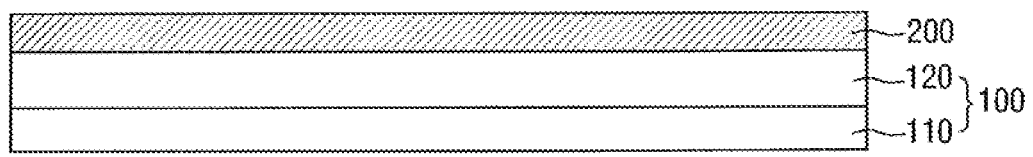
FIG. 3 is a cross-sectional view of the optical film taken along line B-B' of FIG. 1.
Figure 4:
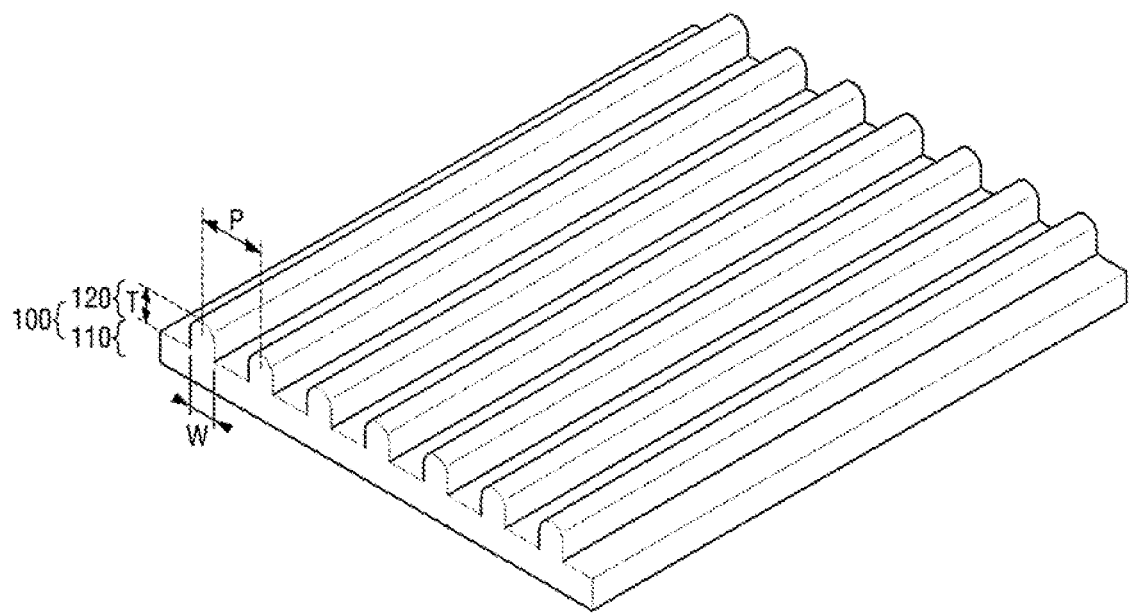
FIG. 4 is a perspective view showing a base film in the optical film of FIG. 1.
Figure 5:
FIG. 5 is a cross-sectional view of the base film of FIG. 4.

FIG. 1 is a perspective view of an optical film according to an exemplary embodiment of the present invention. FIG. 2 is a cross-sectional view of the optical film taken along line A-A' of FIG. 1. FIG. 3 is a cross-sectional view of the optical film taken along line B-B' of FIG. 1. FIG. 4 is a perspective view showing a base film in the optical film of FIG. 1. FIG. 5 is a cross-sectional view of the base film of FIG. 4.

Referring to FIGS. 1 to 5, the optical film may include a base film 100 including a base member 110 and a plurality of lens patterns 120. The lens patterns 120 may be formed on the base member 110 to protrude from the base member 110 and extend in one direction. The optical film may further include a cover film 200 formed on the base film 100 to cover the base member 110 and the lens patterns 120.

The lens patterns 120 may be formed on the base member 110 to extend in one direction. As shown in FIG. 4, the lens patterns 120 may be formed to be spaced apart from each other and extend in one direction. Further, the lens patterns 120 may be formed to be spaced apart from each other and extend in parallel to each other. Further, the base member 110 and the lens patterns 120 may be formed integrally or formed of substantially the same material, but the present invention is not limited thereto.

Each of the lens patterns 120 may be formed to include a curved surface. For example, a top surface of each of the lens patterns 120 may be formed in a curved shape. For example, each of the lens patterns 120 may have a shape of a lenticular lens, an elliptical lens, or the like. For example, the cross-sectional shape of the lens patterns 120 may have a curved shape such as a lenticular, an elliptical shape, or the like, but the present invention is not limited thereto.

Further, a refractive index of the lens patterns 120 may be smaller than a refractive index of the cover film 200, and an aspect ratio of each of the lens patterns 120 may range from 0.8 to 1.6. For example, the aspect ratio of each of the lens patterns 120 is a value obtained by dividing a thickness (e.g., a height) T of each of the lens patterns 120 by a width W of each of the lens patterns 120. The thickness of each of the lens patterns 120 may be a vertical distance to a vertex of each of the lens patterns 120 from the base member 110, and the width W may be a width of a portion of each of the lens patterns 120 in contact with the base member 110. When the optical film in which the aspect ratio of each of the lens patterns 120 is in a range from 0.8 to 1.6 and a refractive index of each of the lens patterns 120 is smaller than the refractive index of the cover film 200 as described above, a viewing angle of a liquid crystal display to which the optical film is applied may be enlarged in a lateral direction and a front luminance of the liquid crystal display may be increased.

The thickness T of each of the lens patterns 120 may range from 1 μm to 100 μm, and the width W of each of the lens patterns 120 may range from 1 μm to 100 μm. When the aspect ratio of the thickness T and width W ranges from 0.8 to 1.6, the viewing angle of the liquid crystal display may be enlarged in the lateral direction and visibility thereof may be increased.

In addition, the refractive index of the cover film 200 may be greater than the refractive index of the lens patterns 120 by at least 0.1. For example, the refractive index of the cover film 200 may be greater than the refractive index of the lens patterns 120 by a value ranging from 0.1 to 0.65. Accordingly, when the optical film is applied to the liquid crystal display, a visibility index and a contrast ratio (CR) may be increased.

The refractive index of the lens patterns 120 may be in a range from 1.0 to 1.49, for example, a range from 1.42 to 1.49. Further, the refractive index of the cover film 200 may be in a range from 1.5 to 1.65, for example, a range from 1.57 to 1.65. When the refractive indices of the lens patterns 120 and the cover film 200 are in the above-mentioned ranges, the front luminance of the liquid crystal display and the viewing angle thereof in the lateral direction may be increased. Further, if the refractive indices of the lens patterns 120 and the cover film 200 are set to be larger than the above-mentioned ranges, the transmittance of the liquid crystal display may be lowered and a yellowish phenomenon may occur.

The optical film may further include an adhesive layer formed on the base member 110 and formed on a surface opposite to a surface on which the cover film 200 is formed. Although it will be described later, the adhesive layer is provided to attach the optical film to a liquid crystal panel. The adhesive layer may include optically transparent optical clear adhesive (OCA), optical clear resin (OCR), or the like.

In a method of fabricating the optical film, as shown in FIG. 4, a step of forming the lens patterns 120 on the base member 110 may be performed. For example, the lens patterns 120 may be formed on the base member 110 by preparing a resin film having the above-mentioned range (e.g., from 1.0 to 1.49 or from 1.42 to 1.49) of the refractive index of the lens patterns 120 and by forming the resin film by using a mold with intaglios each corresponding to one of the lens patterns 120. In an exemplary embodiment of the present invention, the lens patterns 120 may be formed by molding resin using a method such as an imprinting method, or the like.

In addition, the cover film 200 may be formed by coating and curing resin having a refractive index ranging from 1.5 to 1.65 or ranging from 1.57 to 1.65 on the surface of the base member 110 on which the lens patterns 120 are formed. However, the present invention is not limited thereto, for example, a cover film including intaglio patterns having substantially the same shape as the lens patterns 120 of the base film 100 may be prepared and adhered to the base film 111.

The resin forming the cover film 200 may include ultraviolet (UV) curable resin, thermosetting resin, or the like, and may include acrylate-based resin. Accordingly, an optical film may be fabricated by a curing method as described above. Further, the base member 110 and the lens patterns 120 may include UV curable resin, thermosetting resin, or the like. By additionally including fluorine-based resin to the UV curable resin, thermosetting resin, or the like of the cover film 200, the base member 110, and the lens patterns 120, the refractive index of the lens patterns 120 may be adjusted to the above-mentioned range (e.g., from 1.0 to 1.49 or from 1.42 to 1.49).

Figure 6:
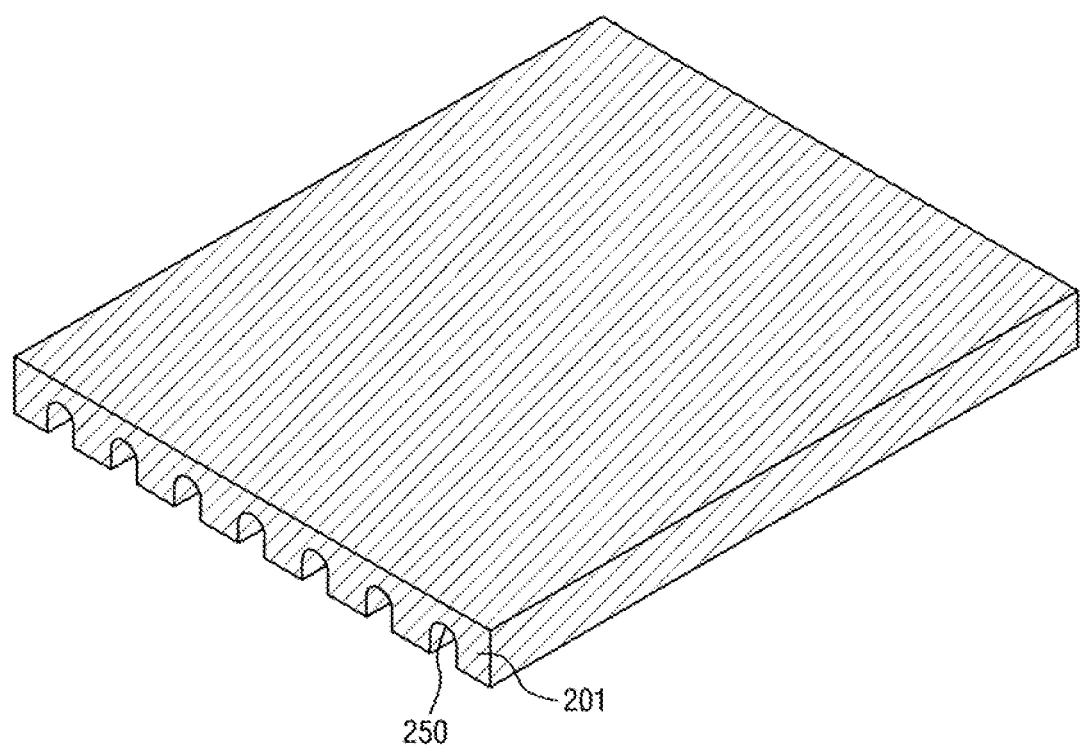
FIG. 6 is a perspective view of an optical film according to an exemplary embodiment of the present invention.
Figure 7:
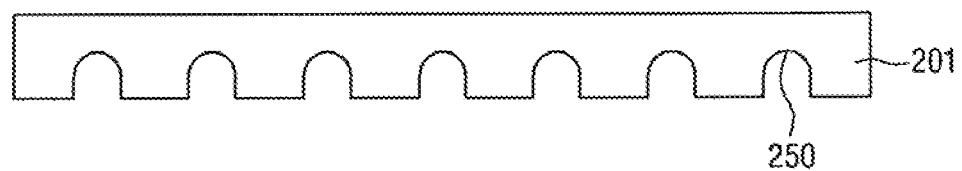
FIG. 7 is a cross-sectional view of the optical film of FIG. 6.

FIG. 6 is a perspective view of an optical film according to an exemplary embodiment of the present invention. FIG. 7 is a cross-sectional view of the optical film of FIG. 6.

Referring to FIGS. 6 and 7, the optical film may include a cover film 201 including intaglios 250 corresponding to lens patterns extending in one direction. Hereinafter, the intaglios 250 corresponding to lens patterns may be referred to as "intaglio lens patterns 250". Further, an aspect ratio of intaglio lens patterns 250 may range from 0.8 to 1.6, and the refractive index of the cover film 201 may range from 1.5 to 1.65. For example, each of the lens patterns extending in one direction may be formed in a shape of intaglios in the cover film 201 of the optical film. In this case, the aspect ratio of each of the intaglio lens patterns 250 may be in a range from 0.8 to 1.6. As described above, when the optical film in which the aspect ratio of each of the intaglio lens patterns 250 is in the range (e.g., from 0.8 to 1.6) and the refractive index of the cover film 201 is in the range (e.g., 1.5 to 1.65), is applied to a liquid crystal display, a front luminance of the liquid crystal display and a viewing angle thereof in the lateral direction may be increased.

The intaglio lens patterns 250 may be formed to extend in one direction of the cover film 201 and may be arranged in parallel to each other. The intaglio lens patterns 250 may be formed to be spaced apart from each other at predetermined intervals. In a non-limiting example, the intaglio lens patterns 250 may be arranged to be spaced apart from each other at regular intervals.

Figure 8:
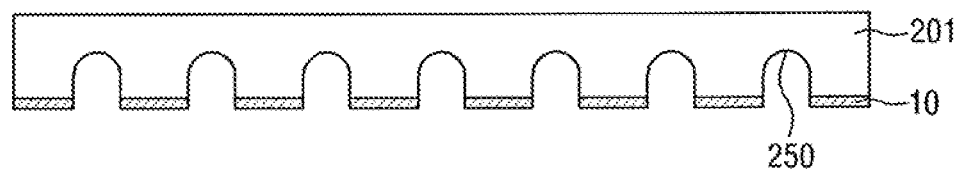
FIG. 8 is a cross-sectional view of an optical film according to an exemplary embodiment of the present invention.

FIG. 8 is a cross-sectional view of an optical film according to an exemplary embodiment of the present invention.

Referring to FIG. 8, the optical film may further include an adhesive 10 which is formed on the surface of the cover film 201 on which the intaglio lens patterns 250 are formed. The adhesive 10 may be formed on the surface of the cover film 201 on which the intaglio lens patterns 250 are formed, and may be formed at positions between the intaglio lens patterns 250. Accordingly, the adhesive 10 might not be formed on the intaglio lens patterns 250. Thus, the optical film may be attached to a liquid crystal panel, which will be described later. Further, since the adhesive 10 is not formed in the intaglio lens patterns 250, distortion of light provided from the liquid crystal panel may be reduced.

Figure 9:
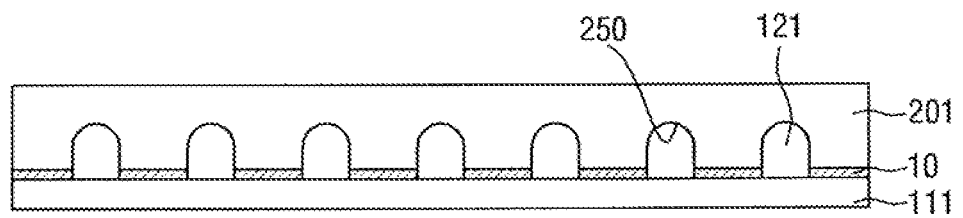
FIG. 9 is a cross-sectional view of an optical film according to an exemplary embodiment of the present invention.

FIG. 9 is a cross-sectional view of an optical film according to an exemplary embodiment of the present invention.

Referring to FIG. 9, the optical film may further include a base film 111 which is attached to a surface of the cover film 201 on which the intaglio lens patterns 250 are formed. Further, the adhesive 10 for adhering the cover film 201 to the base film 111 may be formed between the cover film 201 and the base film 111, and the adhesive 10 may be disposed at positions where the intaglio lens patterns 250 are not formed.

In addition, the optical film may further include an air layer 121 at positions corresponding to the intaglio lens patterns 250 disposed between the cover film 201 and the base film 111. The air layer 121 may have a refractive index substantially close to 1. Based on a difference between the refractive index of the air layer 121 and the refractive index of the cover film 201 and the above-described range (e.g., from 0.8 to 1.6) of the aspect ratio of each of the intaglio lens patterns 250, a viewing angle of the liquid crystal display in the lateral direction and a front luminance thereof may be increased.

Figure 10:
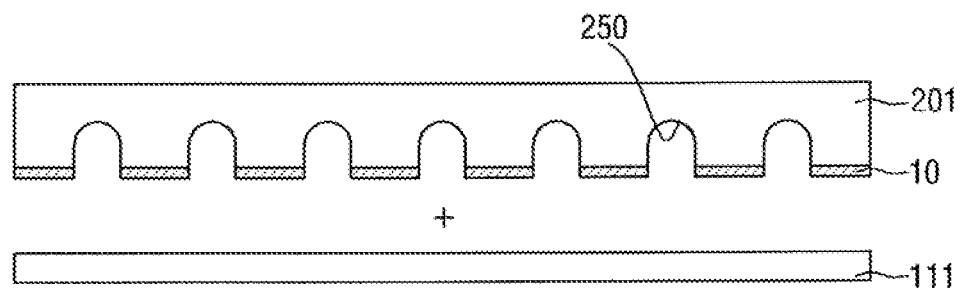
FIG. 10 shows a process of fabricating the optical film of FIG. 9 according to an exemplary embodiment of the present invention.

The optical film shown in FIG. 9 may be fabricated, as shown in FIG. 10. Referring to FIG. 10, an adhesive may be coated at positions between the intaglio lens patterns 250 on the cover film 201 and the cover film 201 may be laminated with the prepared base film 111.

Figure 11:
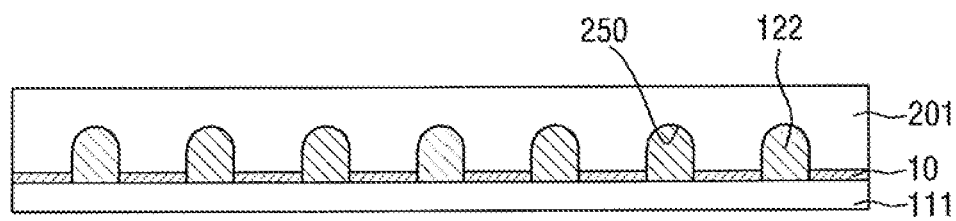
FIG. 11 is a cross-sectional view showing an optical film according to an exemplary embodiment of the present invention.

FIG. 11 a cross-sectional view showing an optical film according to an exemplary embodiment of the present invention. Referring to FIG. 11, the optical film may further include a filling layer 122 filled in the intaglio lens patterns 250 of the optical film. The refractive index of the filling layer 122 may be in a range from 1.0 to 1.49, for example, a range from 1.42 to 1.49. When the refractive index of the filling layer 122 is in the range (e.g., from 1.0 to 1.49 or from 1.42 to 1.49), luminance in a forward direction of light traveling from a liquid crystal display toward the outside may be increased, and a viewing angle of the liquid crystal display in the lateral direction may be increased based on a difference in refractive index between the filling layer 122 and the cover film 201 and the aspect ratio of each of the intaglio lens patterns 250 formed in the cover film 201. The filling layer 122 included in the intaglio lens patterns 250 of the optical film may be implemented by filling a resin having the above range (e.g., from 1.0 to 1.49 or from 1.42 to 1.49)

of the refractive index in positions (e.g., the filling layer 122) between the cover film 201 and the base film 111, and thus, durability of the optical film may be increased due to the resin filled in the filling layer 122.

In the cross-sectional view, each of the intaglio lens patterns 250 may have a shape of a lenticular lens, an elliptical lens, or the like. The intaglio lens patterns 250 each having a cross-sectional shape of a lenticular lens, an elliptical lens, or the like, may be elongated in one direction and arranged in parallel to each other.

A method of fabricating the optical film shown in FIG. 6 may include fabricating the optical film including the intaglio lens patterns 250 on a film including a resin having a refractive index in a range from 1.5 to 1.65, or a range from 1.57 to 1.65 based on an imprinting method.

According to an exemplary embodiment of the present invention, a liquid crystal display including the optical film as described above may be provided.

The liquid crystal display may include a backlight unit providing light, a liquid crystal panel receiving light from the backlight unit and displaying an image in accordance with an applied signal (e.g., image data), and an optical film located on an upper side of the liquid crystal panel. Here, the optical film may include the above-described optical film according to an exemplary embodiment of the present invention.

Figure 12:
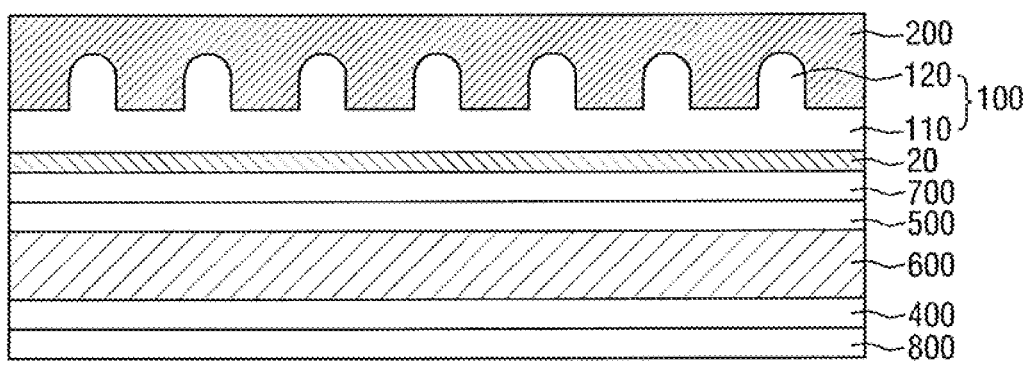
FIG. 12 is a cross-sectional view showing a state where an optical film according to an exemplary embodiment of the present invention is attached to a liquid crystal panel.

FIG. 12 is a cross-sectional view showing a state where an optical film according to an exemplary embodiment of the present invention is attached to a liquid crystal panel in a liquid crystal display.

Referring to FIG. 12, the liquid crystal panel may include a first substrate 400 and a second substrate 500 facing the first substrate 400, and a liquid crystal layer 600 interposed between the first substrate 400 and the second substrate 500. Further, an upper polarizing plate 700 may be located on an upper side of the liquid crystal panel, and a lower polarizing plate 800 may be located on a lower side of the liquid crystal panel.

The optical film may include a plurality of lens patterns 120 extending in one direction, and an aspect ratio of each of the lens patterns 120 may range from 0.8 to 1.6. The optical film may be attached to an upper side of the upper polarizing plate 700 and an adhesive 20 is interposed between the optical film and the upper polarizing plate 700. The upper polarizing plate 700 may be attached to a position at which an image displayed in the liquid crystal display is viewed by a viewer.

Figure 13:
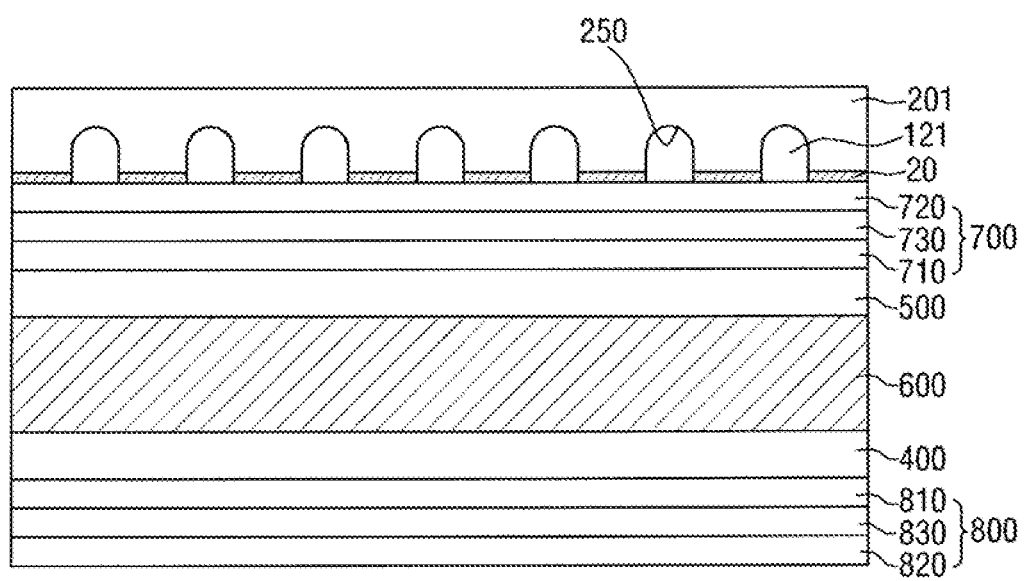
FIG. 13 is a cross-sectional view showing a state where an optical film according to an exemplary embodiment of the present invention is attached to a liquid crystal panel.

As shown in FIG. 12, the lens patterns 120 may be formed on the base member 110 to be spaced apart from each other at predetermined intervals, and the cover film 200 may be formed on the lens patterns 120. However, the present invention is not limited thereto, and intaglio lens patterns 250 may be included in a cover film 201, as shown in FIG. 13. Referring to FIG. 13, a separate base film might not be formed. In this case, the intaglio lens patterns 250 may be formed in the cover film 201, and the cover film 201 itself may serve as an optical film, and may be attached to the upper polarizing plate 700 of the liquid crystal panel by using the adhesive 20.

In the intaglio lens patterns 250, as described above, an air layer having a refractive index substantially close to 1, or a filling layer having a refractive index in a range from 1.0 to 1.49 may be formed.

Hereinafter, elements included in the liquid crystal panel will be described in more detail with reference to FIG. 13.

The liquid crystal panel may have a state in which the liquid crystal layer 600 is interposed between the first substrate 400 and the second substrate 500. The first substrate 400 may be a thin film transistor (TFT) array substrate. For example, a liquid crystal driving electrode, a wiring pattern, a thin film transistor, an alignment layer, or the like may be formed on the first substrate 400. For example, the liquid crystal panel may include a thin film transistor and a pixel electrode on a base member made of a transparent insulating material such as glass, plastic, or the like. The thin film transistor may include a gate electrode, a gate insulating film, a semiconductor layer, an ohmic contact layer, and source/drain electrodes. The pixel electrode may be a field generating electrode formed of transparent conductive oxide, such as ITO, IZO, or the like.

On a surface of the second substrate 500 facing the first substrate 400, color filters, a common electrode, an alignment layer, or the like may be formed. A black matrix may also be formed on the surface of the second substrate 500. For example, the second substrate 500 may include a black matrix, a red color filter, a green color filter, a blue color filter, and a common electrode on a lower surface of the base member made of a transparent insulating material such as glass, plastic, or the like. The black matrix may act to prevent light leakage. The common electrode may be a field generating electrode formed of transparent conductive oxide such as ITO, IZO, or the like.

For the first substrate 400 and the second substrate 500, plastic substrates such as polyethylene terephthalate (PET), polycarbonate (PC), polyimide (PI), polyethylene naphthalate (PEN), polyether sulfone (PES), polyarylate (PAR), cycloolefin copolymer (COC), or the like may be used, but the present invention is not limited thereto. Further, the first substrate 400 and the second substrate 500 may be formed of a flexible material.

The upper polarizing plate 700 may be disposed on the second substrate 500 of the liquid crystal panel, and the lower polarizing plate 800 may be disposed below the first substrate 400 to transmit light with a specific state of polarization. In the case of providing the upper polarizing plate 700 and the lower polarizing plate 800, transmission axes of the polarizers of the polarizing plates 700 and 800 may be substantially parallel or perpendicular to each other.

An operation mode of the liquid crystal panel may include, for example, a twisted nematic mode or an electrically controlled birefringence mode. The electrically controlled birefringence mode may include a vertical alignment mode, an optically compensated bend (OCB) mode, an in-plane switching (IPS) mode, or the like.

Among the operation modes of the liquid crystal panel, a TN mode will be described as an example. If an electric field is not formed in the liquid crystal panel, since there is no voltage difference between the pixel electrode and the common electrode (e.g., the field generating electrodes), liquid crystal molecules of the liquid crystal layer 600 in the liquid crystal panel may be arranged such that major axes of the liquid crystal molecules are arranged to be parallel to the surfaces of the first substrate 400 and the second substrate 500. Thus, the liquid crystal molecules may have a structure in which the major axes thereof are spirally twisted by 90° starting from the first substrate 400 up to the second substrate 500.

In this case, the polarization of the linearly polarized light may be changed by the retardation caused by the refractive index anisotropy of the liquid crystal molecules when the light passes through the liquid crystal layer 600. By adjusting a chiral pitch and dielectric anisotropy ($\Delta\varepsilon$) of the liquid crystal or a thickness (e.g., cell gap) of the liquid crystal panel, the polarization state of the linear polarized light may be adjusted to be rotated by 90° when passing through the liquid crystal panel.

In addition, the upper polarizing plate 700 may include a polarizer 730 including a polyvinyl alcohol-based film on which an iodine or a dichroic dye is adsorbed and oriented, and polarizer protecting films 710 and 720 may be attached to top and bottom portions of the polarizer 730, respectively. In addition, the lower polarizing plate 800 may include a polarizer 830 including a polyvinyl alcohol-based film on which an iodine or a dichroic dye is adsorbed and oriented, and polarizer protecting films 810 and 820 may be attached to top and bottom portions of the polarizer 830, respectively. In an exemplary embodiment of the present invention, one of the polarizer protecting films may be omitted. For example, the polarizer protecting film 710 formed on the surface of the upper polarizing plate 700 to be attached to the liquid crystal panel may be omitted and may be attached to the liquid crystal panel by an adhesive.

Figure 14:
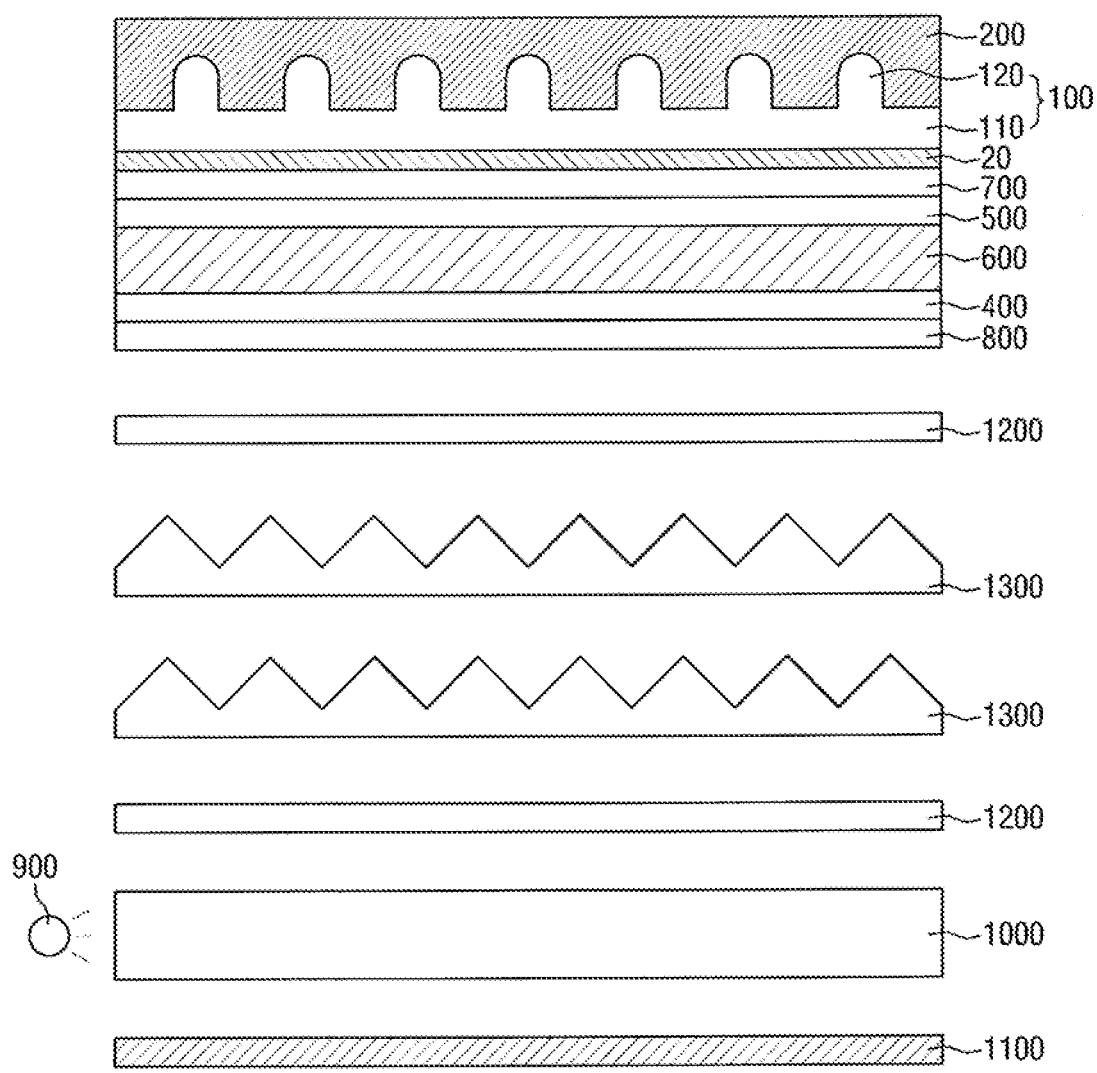
FIG. 14 is a cross-sectional view showing a liquid crystal display according to an exemplary embodiment of the present invention.

FIG. 14 is a cross-sectional view showing a liquid crystal display according to an exemplary embodiment of the present invention. The liquid crystal display of FIG. 14 employs an edge type backlight unit, and may include at least one light source 900, a light guide plate (LGP) 1000 disposed on a side of the light source 900 to guide light emitted from the light source 900, a liquid crystal panel disposed on an upper side of the light guide plate 1000 to display an image in accordance with an applied signal, and a variety of optical plates 1200 and 1300 located between the light source 900 and the liquid crystal panel. Further, a reflective sheet 1100 may be disposed on a lower surface of the light guide plate 1000.

The light source 900 may be disposed on at least one side of the light guide plate 1000. FIG. 14 illustrates a case where the light source 900 is disposed on only one side of the light guide plate 1000, but the present invention is not limited thereto, and for example, a plurality of light sources may be employed and arranged on one side or more than one side of the light guide plate 1000.

The light source 900 may include, for example, a light emitting diode (LED), a cold cathode fluorescent lamp (CCFL), a hot cathode fluorescent lamp (HCFL), an external electrode fluorescent lamp (EEFL), or the like.

The light guide plate 1000 may guide the light emitted from the light source 900 through total internal reflection, reflect the guided light through a scattering pattern, or the like, formed on the lower surface of the light guide plate 1000, and emit the reflected light in an upward direction. The reflective sheet 1100 may be disposed below the light guide plate 1000 to reflect light emitted downward from the light guide plate 1000 in an upward direction.

The light guide plate 1000 may be made of a light transmitting material having a constant refractive index, such as poly methyl methacrylate (PMMA), polycarbonate (PC), or the like, but the present invention is not limited thereto.

An optical plate may be disposed on the light guide plate 1000. The optical plate may include a diffusion sheet 1200 and a prism sheet 1300.

The diffusion sheet 1200 may diffuse and transmit a part of the light propagating from the light source 900 toward the liquid crystal panel, and reflect another part of the light back to a lower side of the diffusion sheet 1200. The liquid crystal panel may be disposed on an upper side of the diffusion sheet 1200. In an exemplary embodiment of the present invention, the diffusion sheet 1200 may be formed of polymethyl methacrylate (PMMA), polystyrene (PS), poly-carbonate (PC), cyclo-olefin copolymers (COC), polyethylene terephthalate (PET), polybutyleneterephtalate (PBT), plastic alloy, or the like, but the present invention is not limited thereto.

In addition, the optical plate may further include a micro-lens array film, a lenticular lens film, or the like. As shown in FIG. 14, a plurality of optical plates may be employed. An arrangement of the optical plates may be changed in various ways.

Since the liquid crystal panel has been described above, a repeated description will be omitted.

Figure 15:
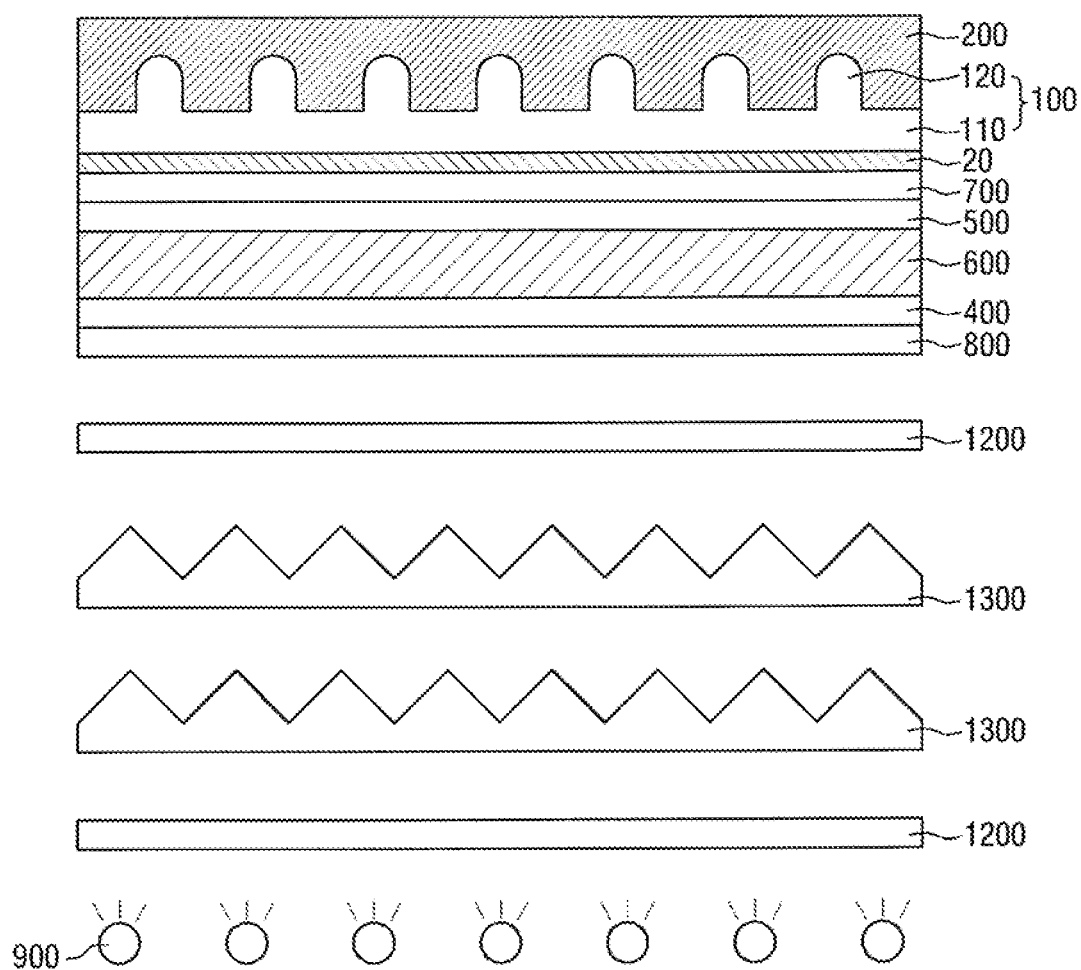
FIG. 15 is a cross-sectional view showing a liquid crystal display according to an exemplary embodiment of the present invention.

FIG. 15 is a cross-sectional view showing a liquid crystal display according to an exemplary embodiment of the present invention. The liquid crystal display of FIG. 15 employs a direct type backlight unit.

The liquid crystal display may include at least one light source 900, a liquid crystal panel, which is disposed on an upper side of the light source 900 to display an image, and optical plates 1200 and 1300 located between the light source 900 and the liquid crystal panel.

The liquid crystal display may be configured such that the light emitted from the light source 900 disposed in a lower side of the liquid crystal display is uniformly dispersed by the diffusion sheet 1200 at an upper side thereof, is condensed by the prism sheet 1300, and is provided to the liquid crystal panel at an upper side thereof. Since the liquid crystal panel, the light source 900, the diffusion sheet 1200, and the prism sheet 1300 have been described above, a repeated description will be omitted.

A backlight assembly including the light source, the light guide plate, the reflective sheet, the optical plate, or the like may be accommodated in a bottom chassis, and the liquid crystal panel may be mounted on an intermediate frame and fixed to a top chassis on an upper side of the liquid crystal display. The top chassis may include a portion to expose a display area where an image is displayed. By coupling the top chassis, the bottom chassis, and the intermediate frame, the respective elements constituting the liquid crystal display may be fixed and accommodated in the liquid crystal display.

Hereinafter, an optical film according to an exemplary embodiment of the present invention will be described in more detail using various examples.

Example 1

An optical film is fabricated by forming a cover film having a refractive index of 1.57 on a base film, which is made of resin having a refractive index of 1.42 and on which lens patterns are formed, and by adjusting a width and a thickness of each of the lens patterns to 9.9 μm and 10.7 μm, respectively. In this case, an aspect ratio of the thickness to the width is about 1.08.

Example 2

An optical film is fabricated in substantially the same manner as in example 1 except that the width and thickness of each of the lens patterns are adjusted to 10.1 μm and 15.3 μm, respectively. In this case, the aspect ratio of the thickness to the width is about 1.51.

Example 3

An optical film is fabricated by forming a base film and a cover film without forming lens patterns.

Example 4

An optical film is fabricated in substantially the same manner as in example 1 except that the width and thickness of each of the lens patterns are adjusted to 11.9 μm and 6.0 μm, respectively. In this case, the aspect ratio of the thickness to the width is about 0.50.

Example 5

An optical film is fabricated in substantially the same manner as in example 1 except that the width and thickness of each of the lens patterns are adjusted to 10.4 μm and 20.0 μm, respectively. In this case, the aspect ratio of the thickness to the width is about 1.92.

Example 6

An optical film is fabricated in substantially the same manner as in example 1 except that the width and thickness of each of the lens patterns are adjusted to 8.3 μm and 27.8 μm, respectively. In this case, the aspect ratio of the thickness to the width is about 3.35.

Example 7

An optical film is fabricated in substantially the same manner as in example 1 except that the width and thickness of each of the lens patterns are adjusted to 10.1 μm and 24.2 μm, respectively. In this case, the aspect ratio of the thickness to the width is 2.40.

A visibility index, a contrast ratio (CR), and a viewing angle of a liquid crystal display to which the optical film fabricated according to at least one of the above-described examples is applied were measured, and the measurement results are shown in Table 1 below.

TABLE 1

|  | Aspect ratio | Visibility index | CR | Viewing angle (°) |
|---|---|---|---|---|
| Example 1 | 1.08 | 0.28 | 6184:1 | 57 |
| Example 2 | 1.51 | 0.26 | 5203:1 | 58 |
| Example 3 | — | 0.38 | 7224:1 | 49 |
| Example 4 | 0.50 | 0.35 | 6305:1 | 51 |
| Example 5 | 1.92 | 0.25 | 3541:1 | 58 |
| Example 6 | 3.35 | 0.23 | 2035:1 | 65 |
| Example 7 | 2.40 | 0.21 | 2614:1 | 63 |

The visibility index in Table 1 is a numerical value corresponding to a difference between a Gamma value measured at the front of the liquid crystal panel and a Gamma value measured at a viewing angle of 60° of the liquid crystal panel for each gray scale. For example, a visibility index having a value close to 0 may be understood such that there is no difference in, e.g., gamma value, between the front and the side of the liquid crystal panel. Thus, for example, as the visibility index approaches a value of 0, visibility of the liquid crystal panel increases. As can be seen in example 1 or 2, which was fabricated with the particular refractive indices, widths, and thicknesses according to an exemplary embodiment of the present invention as described above, the visibility index is low (e.g., less than 0.3), and thus, the optical film made in accordance with an exemplary embodiment of the present invention may have excellent visibility characteristics.

The CR in Table 1 is a numerical value obtained by dividing white luminance by black luminance. For example, the CR which is equal to or greater than 5000:1 may be understood as excellent CR characteristics. The CR values of the liquid crystal display, to which the optical film fabricated based on example 1 or 2 according to an exemplary embodiment of the present invention is applied, are equal to or greater than 5000:1, and thus, the optical film fabricated based on example 1 or 2 may have excellent CR characteristics.

The viewing angle in Table 1 indicates a range of a viewing angle at which luminance is 50% of the front luminance. For example, the viewing angle having a high value may be understood such that side visibility of the liquid crystal display is excellent and the viewing angle of the liquid crystal display is wide. The liquid crystal display to which the optical film fabricated according to an exemplary embodiment of the present invention is applied may have an excellent viewing angle.

While the present invention has been particularly shown and described with reference to exemplary embodiments thereof, it will be understood that various changes in form and details may be made therein without departing from the spirit and scope of the present invention.

What is claimed is:

1. An optical film comprising:
   a cover film including intaglios of a plurality of lens patterns extending in a first direction;
   a base film which is attached to a surface of the cover film on which the intaglios of the lens patterns are formed; and
   an adhesive disposed between the base film and the surface of the cover film, the adhesive formed on a first portion of the surface of the cover film,
   wherein the intaglios of the lens patterns are not formed on the first portion of the surface,
   wherein an aspect ratio of at least one of the intaglios of the lens patterns ranges from 0.8 to 1.6,
   wherein a refractive index of the cover film ranges from 1.5 to 1.65, and
   wherein the adhesive does not overlap the intaglios of a plurality of lens patterns in a direction perpendicular to the surface of the cover film.

2. The optical film of claim 1, further comprising an air layer in the intaglios of the lens patterns disposed between the cover film and the base film.

3. The optical film of claim 1, further comprising a filling layer disposed in the intaglios of the lens patterns of the cover film,
   wherein a refractive index of the filling layer ranges from 1.0 to 1.49.

4. The optical film of claim 1, wherein at least one of the intaglios of the lens patterns has a shape of a lenticular lens or an elliptical lens.

* * * * *